(12) United States Patent
Nishimura et al.

(10) Patent No.: US 9,278,405 B2
(45) Date of Patent: Mar. 8, 2016

(54) WELDING TORCH

(75) Inventors: Yoshihito Nishimura, Tokyo (JP); Kazuyuki Kobayashi, Tokyo (JP); Tooru Iijima, Tokyo (JP); Kazuo Masumoto, Tokyo (JP)

(73) Assignee: IHI CORPORATION (JP)

( * ) Notice: Subject to any disclaimer, the term of this patent is extended or adjusted under 35 U.S.C. 154(b) by 162 days.

(21) Appl. No.: 14/123,674

(22) PCT Filed: Jun. 18, 2012

(86) PCT No.: PCT/JP2012/065481
§ 371 (c)(1),
(2), (4) Date: Dec. 3, 2013

(87) PCT Pub. No.: WO2012/176724
PCT Pub. Date: Dec. 27, 2012

(65) Prior Publication Data
US 2014/0091068 A1    Apr. 3, 2014

(30) Foreign Application Priority Data

Jun. 22, 2011   (JP) .................. 2011-138311

(51) Int. Cl.
B23K 10/00    (2006.01)
B23K 9/29     (2006.01)
B23K 9/167    (2006.01)
B23K 35/02    (2006.01)

(52) U.S. Cl.
CPC .............. B23K 9/296 (2013.01); B23K 9/1675 (2013.01); B23K 35/02 (2013.01); B23K 35/0255 (2013.01); B23K 35/0261 (2013.01); B23K 35/0277 (2013.01); B23K 35/0294 (2013.01)

(58) Field of Classification Search
CPC .......... B23K 9/29; B23K 9/173; B23K 9/287; B23K 9/282; B23K 9/296; B23K 35/0277; B23K 35/02
USPC .............. 219/137.2, 137.61, 138, 139, 76.15, 219/76.16
See application file for complete search history.

(56) References Cited

U.S. PATENT DOCUMENTS

| 6,683,279 B1 * | 1/2004 | Moerke ....................... 219/137.2 |
| 2005/0218132 A1 * | 10/2005 | Wells ....................... 219/137.61 |
| 2011/0278274 A1 * | 11/2011 | Rogers ....................... 219/137 R |

FOREIGN PATENT DOCUMENTS

| GB | 778963 | 7/1957 |
| JP | 31-000062 | 1/1956 |

(Continued)

OTHER PUBLICATIONS

International Search Report and Written Opinion mailed Aug. 21, 2012 in corresponding PCT International Application No. PCT/JP2012/065481.

(Continued)

Primary Examiner — Mark Paschall
(74) Attorney, Agent, or Firm — Ostrolenk Faber LLP

(57) ABSTRACT

In a multi-electrode welding torch, electrodes (2) are configured into a shape that has an arc-shaped curved surface area (R) in at least a portion of a cross-section thereof that is orthogonal to the longitudinal direction thereof. Collets (4) are each provided with a groove portion (4a) in which an electrode (2) is fitted, and whose inner wall surfaces (4b) come into contact in a plurality of locations with the curved surface area (R) when viewed in the longitudinal direction of the electrode (2).

6 Claims, 7 Drawing Sheets

(56) References Cited

FOREIGN PATENT DOCUMENTS

| | | |
|---|---|---|
| JP | 53-41321 | 4/1978 |
| JP | 53-060537 | 5/1978 |
| JP | 57-194788 | 12/1982 |
| JP | 7-227674 | 8/1995 |
| JP | 08-206839 | 8/1996 |
| JP | 09-201678 | 8/1997 |
| JP | 09-295154 | 11/1997 |
| JP | 11-010345 | 1/1999 |
| JP | 2000-071074 | 3/2000 |
| JP | 2000-094137 | 4/2000 |
| JP | 4683673 | 5/2011 |

OTHER PUBLICATIONS

Search Report dated Apr. 28, 2015 issued in corresponding European Patent Application No. 12803182.0.

Office Action dated Jun. 24, 2014 issued in corresponding Japanese Patent Application No. 2013-521571 with English translation.

* cited by examiner

WELDING TORCH

CROSS-REFERENCE TO RELATED APPLICATIONS

The present application is a 35 U.S.C. §§371 national phase conversion of PCT/JP2012/065481, filed Jun. 18, 2012, which claims priority to Japanese Patent Application No. 2011-138311, filed Jun. 22, 2011, the contents of which are incorporated herein by reference. The PCT International Application was published in the Japanese language.

FIELD OF THE INVENTION

The present invention relates to a welding torch.

BACKGROUND ART

In Patent document 1, for example, a multi-electrode type of welding torch that is able to achieve high-speed welding when performing TIG welding is disclosed.

As is shown in Patent document 1, this type of multi-electrode welding torch is provided with a pair of electrodes that are placed opposite each other on either side of an insulating material, and a collet or the like that fixes these electrodes in position.

In addition, in Patent document 1, in order to weld an even narrower groove, a system in which the electrodes are formed in a thin plate shape, and the distal ends of the electrodes are formed as pointed tips is employed.

RELATED ART DOCUMENTS

Patent documents

[Patent document 1] Japanese Patent Application, First Publication No. 2000-94137

DISCLOSURE OF THE INVENTION

Problems to be Solved by the Invention

In Patent document 1, a configuration in which the electrodes are formed in a thin plate shape, and the distal ends of the electrodes are formed as pointed tips is employed. This configuration has the highly beneficial merit that it makes it possible to weld narrow grooves.

However, because the electrodes are formed from a tungsten-based material, working the electrodes is problematic, and it is difficult to form the electrodes into thin plates. Because of this, manufacturing costs are high for these electrodes.

Accordingly, the manufacturing of a multi-electrode type of welding torch in which lower-cost electrodes can be used is widely desired.

For this reason, manufacturing the electrodes from round rods having a circular cross-section that are formed from a tungsten-based material has been proposed. Round rods having a circular cross-section that are formed from a tungsten-based material are also available commercially, and can be manufactured at low cost because the manufacturing technology is already established. Accordingly, manufacturing electrodes at low cost is possible.

However, if the electrodes are formed from round rods having a circular cross-section, then the electrodes have an arc-shaped curved surface area in at least a portion of their cross-section.

Power is supplied to an electrode via a metal component known as a collet. If however, the electrode has an area with a curved surface, then compared with when the electrode is formed in a conventional plate shape having a widened plane, the contact area between the collet and the electrode is reduced, and there is a possibility that the power supply will become unstable.

More specifically, when the electrode has a plate shape, because the surface of the collet that is able to make contact with the electrode surface has the same plate shape as the electrode surface, a broad surface contact can be ensured. In contrast, if the electrode is formed in a rod-shape having a circular cross-section, then because it linearly contacts the plate-shaped collet, there is a decrease in the contact area.

The present invention was conceived in view of the above-described problems, and it is an object thereof to provide a welding torch that, when electrodes that have curved surface areas in their cross-sectional configuration are used in a multi-electrode welding torch, enables the contact area between the collet and the electrodes to be increased so that power can be supplied stably to the electrodes.

Means for Solving the Problem

The present invention employs the following structure as a means of solving the above-described problem.

A first aspect of the present invention is a welding torch that includes: a plurality of electrodes that are insulated from the welding torch by an insulating material: and collets that are in contact with the electrodes and conduct power to the electrodes, and employs a structure in which the electrodes are shaped such that they have an arc-shaped curved surface area in at least a portion of a cross-sectional shape thereof that is orthogonal to the longitudinal direction thereof, and each collet is provided with a groove portion in which the electrode is fitted, and whose inner wall surface is in contact with a plurality of locations of the curved surface area when looking from the longitudinal direction of the electrode.

A second aspect of the present invention employs a structure in which, in the above-described first aspect, a notch portion is provided in a distal end of the collet that faces towards a distal end side of the electrode.

In this case, it is desirable for the notch portion to be provided in a portion of the distal end of the collet that does not come into contact with the electrode.

A third aspect of the present invention employs a structure in which, in the above-described first or second aspects, there is provided a collet supporting component that is disposed such that its position is fixed relative to the electrode, and the collet is supported by the collet supporting component such that the collet is able to be tilted relative to the electrode.

A fourth aspect of the present invention employs a structure in which, in any of the above-described first through third aspects, the collet is supported by the collet supporting component such that the collet can be displaced in a direction that is orthogonal to the longitudinal direction of the electrode.

A fifth aspect of the present invention employs a structure in which, in any of the above-described first through fourth aspects, the shape of the groove portion when viewed in the longitudinal direction of the electrode is a trapezoidal shape.

A sixth aspect of the present invention employs a structure in which, in any of the above-described first through fifth aspects, there are provided projecting portions that protrude from inner wall surfaces of the groove portion, and engagement holes that are provided in the electrode and with which the projecting portions engage.

Effects of the Invention

According to the present invention, the collet is provided with a groove portion in which an electrode is fitted, and whose inner wall surfaces are in contact with a plurality of locations of the curved surface area of the electrode when looking from the longitudinal direction of the electrode.

Consequently, a minimum of two contact locations can be guaranteed between the collet and the electrode when looking from the longitudinal direction of the electrode.

Accordingly, according to the present invention, when electrodes that have curved surface areas in their cross-sectional configuration are used in a multi-electrode type of welding torch, it is possible to increase the contact area between the collets and the electrodes, so that power can be supplied stably to the electrodes.

EMBODIMENTS FOR CARRYING OUT THE INVENTION

Hereinafter, an embodiment of a welding torch according to the present invention will be described with reference made to the drawings. Note that, in the following drawings, the scale of the respective components has been appropriately altered in order to make each component a recognizable size.
(Structure of a Welding Torch of the Present Embodiment)

Figure 1A:
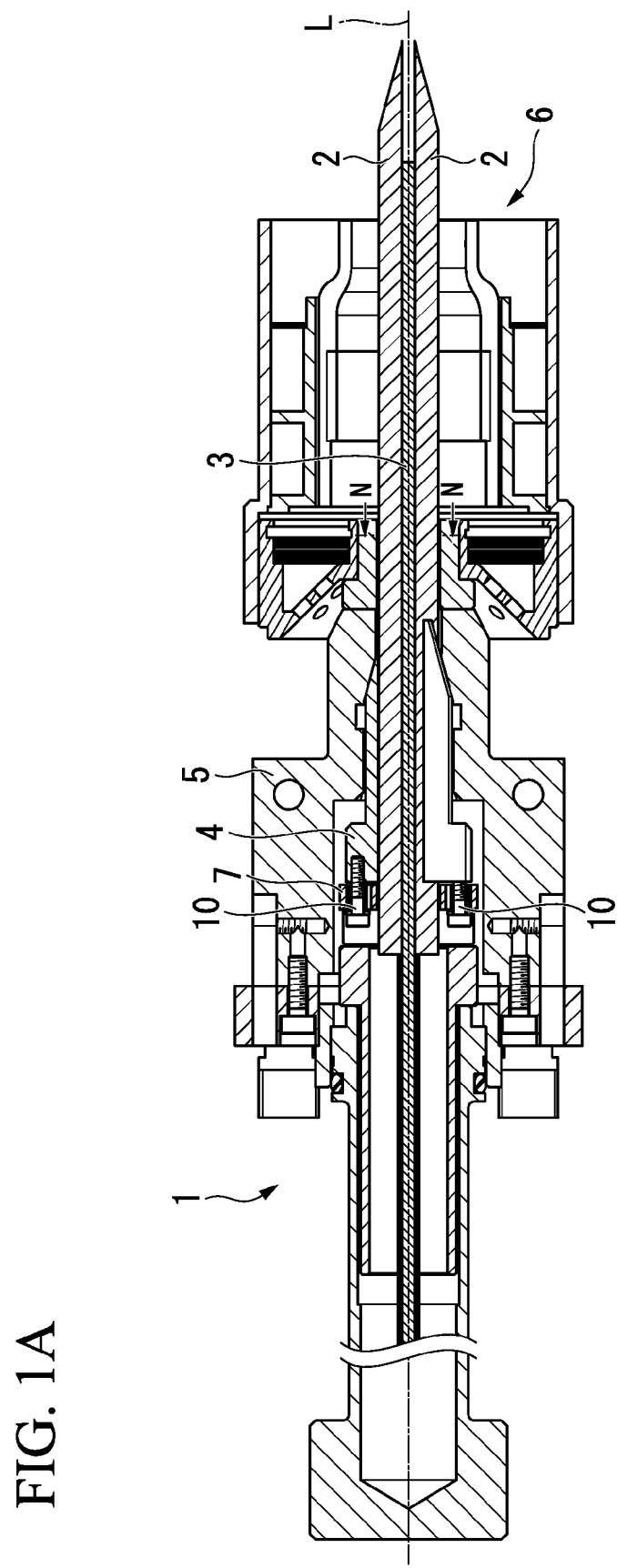
FIG. 1A is a cross-sectional view taken on a plane extending along a central axis, and showing the schematic structure of a welding torch in an embodiment of the present invention.
Figure 1B:
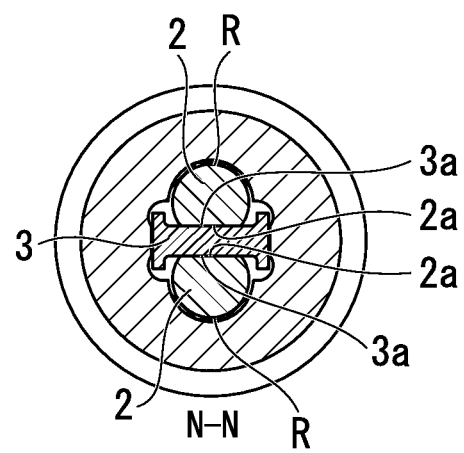
FIG. 1B is a cross-sectional view taken along a line N-N in FIG. 1A.

FIGS. 1A and 1B are schematic structural views of a welding torch 1 of the present embodiment which is used for TIG welding. Note that FIG. 1A is a cross-sectional view on a plane extending along a central axis L, while FIG. 1B is a cross-sectional view taken along a line N-N in FIG. 1A.

The welding torch 1 shown in FIG. 1A is provided with electrodes 2, insulating material 3, collets 4, a casing 5, and a gas supply portion 6.

The electrodes 2 are supplied with current from a power supply apparatus (not shown), and generate an arc between themselves and a welding material.

In the welding torch 1 of the present embodiment, two electrodes 2 are disposed opposite each other on either side of the insulating material 3. Namely, the welding torch 1 of the present embodiment is provided with a pair of electrodes 2 that are placed on either side of the insulating material 3.

As is shown in FIG. 1B, the electrodes 2 are formed by round rods having a circular cross-section that are made from a tungsten-based material.

As is shown in FIG. 1A, distal end sides of the electrodes 2 are formed into points such that distal endmost portions thereof are positioned on a central axis L side.

Moreover, as is shown in FIG. 1B, when viewed from the distal end side, a portion of a circumferential edge of each electrode 2 is cut away so as to form a plane that is parallel with the axis of the electrode 2. As a result, each electrode 2 is provided with a planar portion 2a as a worked portion that is formed by this cutting away.

Moreover, the electrodes 2 are disposed such that the planar portions 2a thereof face towards the insulating material 3 side, and the planar portions 2a are in contact with the insulating material 3.

As is shown in FIG. 1B, these electrodes 2 are shaped so as to have an arc-shaped curved surface area R in at least a portion of a cross-sectional configuration thereof that is orthogonal to the longitudinal direction thereof.

The insulating material 3 is interposed between two of the electrodes 2, and prevents the two electrodes 2 from coming into contact with each other and short-circuiting.

As is shown in FIG. 1B, the shape of the insulating material 3 is such that a cross-section thereof is formed in an I shape.

In addition, the portions of the insulating material 3 that come into contact with the planar portions 2a of the electrodes 2 are formed as planar portions 3a that are in surface contact with the planar portions 2a of the electrodes 2.

A collet 4 is provided for each one of the electrodes 2, and each collet conducts the current that is supplied from a power supply apparatus (not shown) to the electrode 2. Each collet 4 is placed on the outer side of an electrode 2 when viewed from the distal end side of the electrodes 2.

Figure 2A:
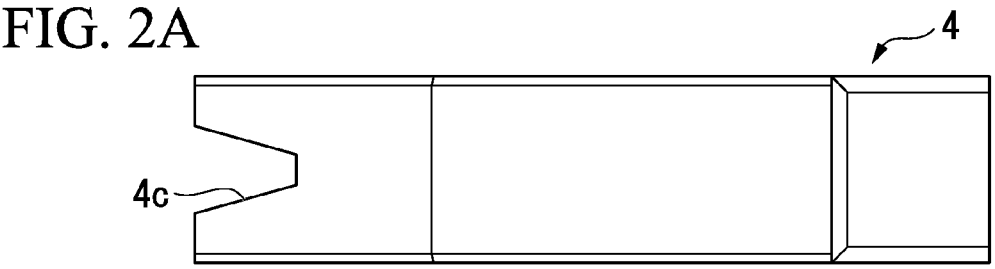
FIG. 2A is a view of a collet that is provided in the welding torch according to an embodiment of the present invention as seen from the opposite side from the electrodes.
Figure 2B:
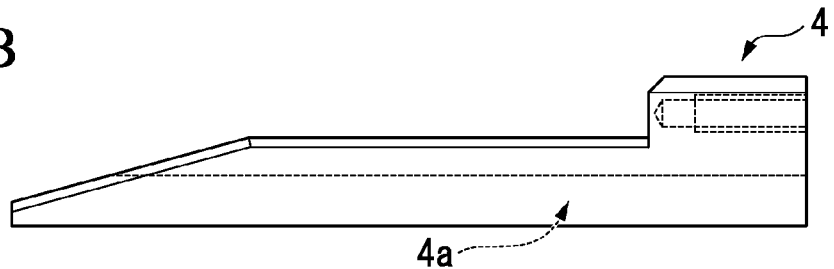
FIG. 2B is a side view of the collet shown in FIG. 2A.
Figure 2C:
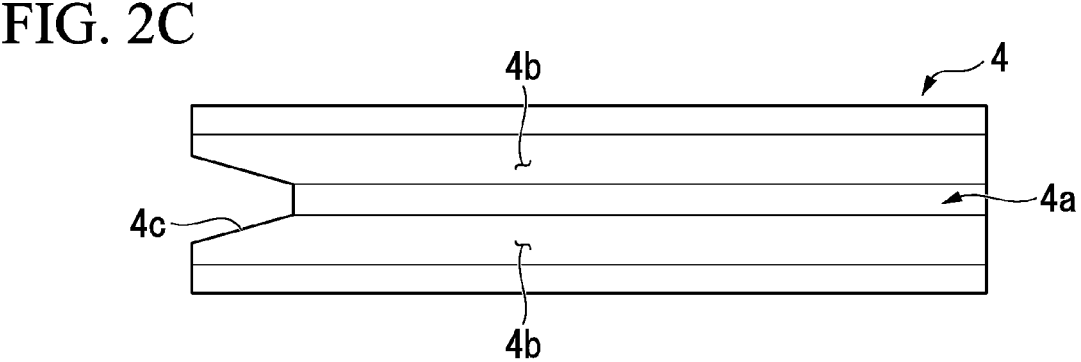
FIG. 2C is a view seen from the electrode side of the collet shown in FIG. 2A.
Figure 2D:
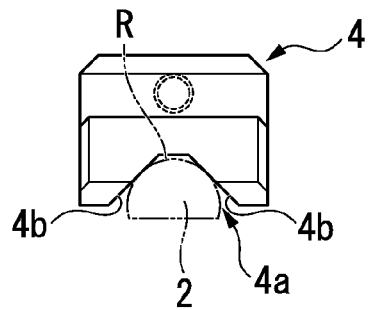
FIG. 2D is a view seen from the rear end side of the collet shown in FIG. 2A.

FIGS. 2A to 2D show the overall structure of a collet 4. Note that FIG. 2A is a view of the collet 4 as seen from the opposite side from the electrode 2, FIG. 2B is a side view of the collet 4, FIG. 2C is a view of the collet 4 as seen from the electrode 2 side, and FIG. 2D is a view of the collet 4 as seen from the rear end side (i.e., the opposite side from the distal end of the electrode 2).

In the present embodiment, each collet 4 is formed extending in the longitudinal direction of the electrode 2 and, as is shown in FIGS. 2C and 2D, is provided with a groove portion 4a whose shape as seen from an end surface side of the electrode 2 is trapezoidal.

As is shown in FIG. 2D, the groove portion 4a is formed such that, when the electrode 2 is fitted into the collet 4, the curved surface area R of the electrode 2 is in contact with inner wall surfaces 4b.

In addition, in the present embodiment, the width and depth of the groove portion 4a are set such that the inner wall surfaces 4b of the grove portion 4a are in contact in two locations with the curved surface area R of the electrode 2.

Moreover, in the present embodiment, as is shown in FIGS. 2A and 2C, a notch portion 4c, which is formed by cutting the groove portion 4a in a V-shape that extends towards the opposite side from the distal end, is provided in the distal end of the collet 4 that extends towards the distal end side of the electrode 2. The notch portion 4c is provided in a portion of the groove portion 4a that does not come into contact with the electrode 2 when the electrode 2 is fitted into the collet 4.

Each collet 4 is supported such that it is able to be tilted relative to the electrode 2 around the end thereof that is on the opposite side from the distal end (described below in detail). Because of this, the distal end of the collet 4 is the portion that comes into contact with the electrode 2 with the greatest reliability. By providing the notch portion 4c in a part of the distal end of the collet 4 that does not come into contact with the electrode 2, compared with when the notch portion 4c is not provided, the distal end of the collet 4 appears to be lengthened, and the portion that reliably comes into contact with the electrode 2 can be increased.

This collet 4 is supported by a collet base 7 (i.e., a collet supporting component).

Figure 3A:
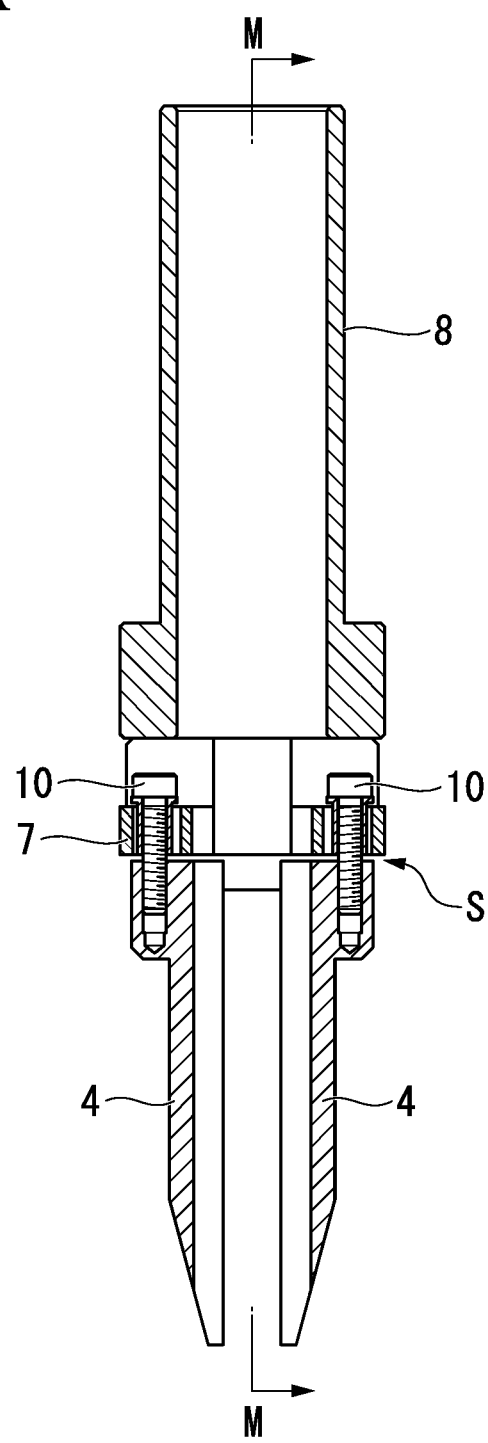
FIG. 3A is a cross-sectional view showing a collet and a collet base and the like that have been removed from the welding torch according to an embodiment of the present invention.
Figure 3B:
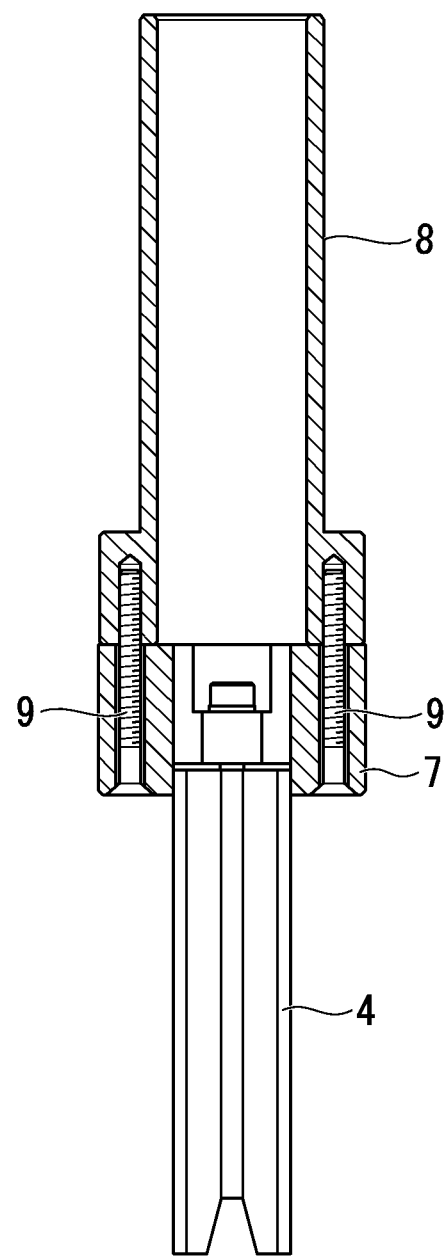
FIG. 3B is a cross-sectional view taken along a line M-M in FIG. 3A.
Figure 4:
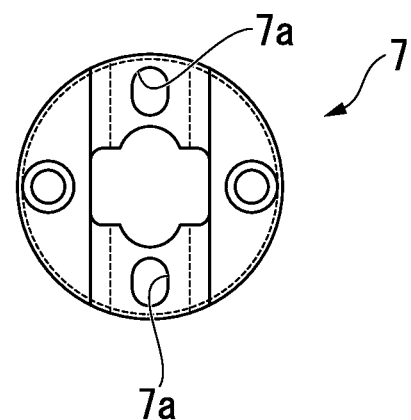
FIG. 4 is a plan view of a collet base that is provided in the welding torch according to an embodiment of the present invention.

FIGS. 3A and 3B are cross-sectional views showing a collet 4 and collet base 7 that have been removed from the welding torch. Note that FIG. 3B is a cross-sectional view taken along a line M-M in FIG. 3A. FIG. 4 is a plan view of the collet base 7.

As is shown in FIG. 3B, the collet base 7 is fastened by bolts 9 to an adaptor 8 that is fixed to the casing 5 so that, as a result of this structure, the position of the collet base 7 relative to the electrode 2 is set. As is shown in FIG. 4, elongated holes 7a, which are elongated in a radial direction, are provided in the collet base 7. In addition, as is shown in FIG. 3A, bolts 10 that are able to move relatively inside the elongated holes 7a in the longitudinal direction of the elongated holes 7a are inserted through the elongated holes 7a, and the collet 4 is fixed to these bolts 10.

As is shown in FIG. 3A, an end of the collet 4 (i.e., the end on the opposite side from the distal end) is positioned such that a slight gap S is provided between itself and the collet base 7. As a result, the collet 4 is able to be tilted around the end thereof that is on the opposite side from the distal end where the notch portion 4c is provided.

Moreover, because the collet 4 is fixed to the bolts 10 that are able to move inside the elongated holes 7a that are elongated in the radial direction of the collet base 7, the collet 4 can be displaced in a direction that is orthogonal to the longitudinal direction of the electrode 2.

The casing 5 surrounds from the outside thereof the portion of the electrodes 2 that does not have the collet 4 and collet base 7 placed outside it, and fixes the collet 4 in position by being placed against the outer circumferential surface of the collet 4.

The gas supply portion 6 is placed on the distal end side of the welding torch 1, and supplies gas that is used for forming an arc to the distal end of the electrodes 2.

(Operation and Effects of the Welding Torch of the Present Embodiment)

According to the welding torch 1 of the present embodiment which is constructed in the manner described above, each collet 4 is provided with a groove portion 4a in which the electrode 2 is fitted, and whose inner wall surfaces 4b are in contact with a plurality of locations (two locations in the present embodiment) of the curved surface area R when looking from the longitudinal direction of the electrode 2.

Namely, when viewed from the longitudinal direction of the electrodes 2, a minimum of at least two contact locations where the collets 4 and the electrodes 2 are in mutual contact are ensured.

Accordingly, according to the welding torch 1 of the present embodiment, in a multi-electrode type of welding torch, it is possible to increase the contact area between the collets 4 and the electrodes 2 when electrodes 2 that have a curved surface area R in the cross-sectional configuration thereof are used, and to thereby ensure a stable supply of power to the electrodes 2.

Moreover, in the welding torch 1 of the present embodiment, the notch portion 4c is provided in the distal end of each collet 4 that points towards the distal end of the electrode 2.

Consequently, as is described above, the distal end of each collet 4 has the appearance of being lengthened, and it is possible to increase the locations where the collet 4 is in reliable contact with the electrode 2. Accordingly, it is possible to more reliably ensure a stable supply of power to the electrode 2.

Moreover, in the welding torch 1 of the present embodiment, each collet 4 is supported by the collet base 7 such that it is able to be tilted relative to the electrode 2.

Because of this, when the welding torch 1 of the present embodiment is being assembled, the collet 4 can be tilted such that it is securely in contact with the electrode 2.

However, the greater the angle of inclination of the collet 4 relative to the electrode 2, the smaller the contact area between the electrode 2 and the collet 4.

In contrast to this, in the welding torch 1 of the present embodiment, each collet 4 is supported by a collet base 7 such that it is able to be displaced in a direction that is orthogonal to the longitudinal direction of the electrode 2.

Because of this, according to the welding torch 1 of the present embodiment, it is possible to prevent the angle of inclination of the collet 4 relative to the electrode 2 from becoming too large, and to guarantee a sufficient size for the contact area between the electrode 2 and the collet 4.

Moreover, in the welding torch 1 of the present embodiment, the groove portions 4a are formed in a trapezoidal shape. Because of this, it is possible to reliably secure two contact locations between the electrodes 2 and the collets 4 while at the same time minimizing the depth of the groove portions 4a.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

Figure 5A:
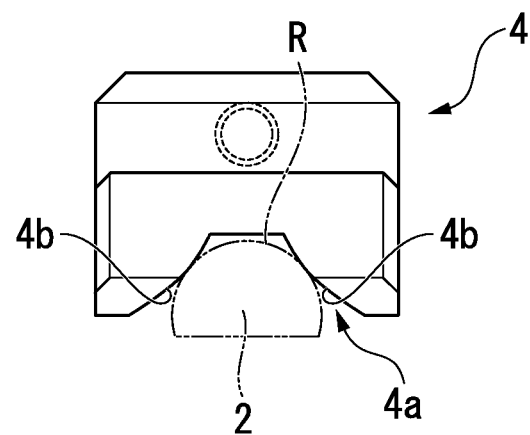
FIG. 5A is a typical view showing a variant example of a welding torch according to an embodiment of the present invention.

For example, as is shown in FIG. 5A, it is also possible to form the inner wall surfaces 4b of the groove portion 4 as curved surfaces that bulge towards the electrode 2.

By employing this type of structure, the inner wall surfaces 4b of the groove portion 4 can be made to press firmly against the curved surface area R of the electrode 2, and it is possible to secure an even greater area of contact between the electrode 2 and the collet 4.

Figure 5B:
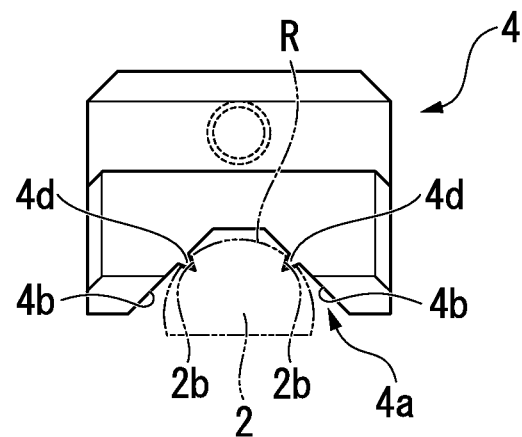
FIG. 5B is a typical view showing a variant example of a welding torch according to an embodiment of the present invention.

Moreover, as is shown in FIG. 5B, it is also possible to employ a structure in which there are provided projecting portions 4d that protrude from the inner wall surfaces 4b of the groove portion 4, and engagement holes 2b that are provided in the curved surface area R of the electrode 2 and with which the projecting portions engage.

In this structure, as a result of the projecting portions 4*d* engaging with the engagement holes 2*b*, any rotation of the electrode 2 relative to the collet 4 can be prevented.

Figure 5C:
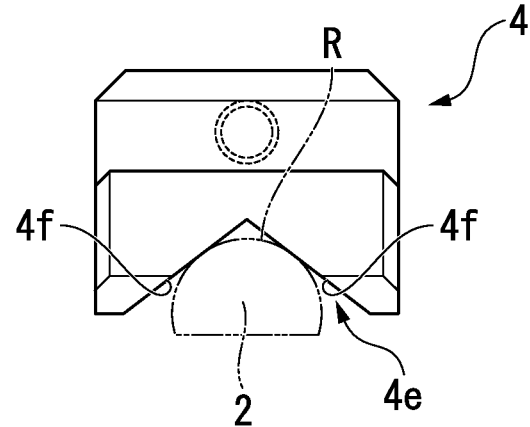
FIG. 5C is a typical view showing a variant example of a welding torch according to an embodiment of the present invention.

Moreover, as is shown in FIG. 5C, it is also possible to employ a structure in which a triangular groove portion 4*e* is provided instead of the trapezoidal groove portion 4*a*.

In this type of structure as well, as is shown in FIG. 5C, two contact locations between inner wall surfaces 4*f* and the electrode 2 can be secured.

Moreover, in the above-described embodiment, a structure has been described in which, when viewed from the longitudinal direction of the electrode 2, the electrode 2 and the collet 4 are in contact with each other in two contact locations.

However, the present invention is not limited to this, and it is also possible to employ a structure in which the electrode 2 and the collet 4 are in contact with each other in an even greater number of contact locations.

INDUSTRIAL APPLICABILITY

According to the present invention, in a multi-electrode type of welding torch, it is possible to increase the contact area between the collets and the electrodes, and to thereby ensure a stable supply of power to the electrodes.

DESCRIPTION OF THE REFERENCE NUMERALS

1 ... Welding torch, 2 ... Electrode, 2*b* ... Engagement hole, 3 ... Insulating material, 4 ... Collet, 4*a* ... Groove portion, 4*b* ... Inner wall surface, 4*c* ... Notch portion, 4*d* ... Projecting portion, 4*e* ... Groove portion, 4*f* ... Inner wall surface, 5 ... Casing, 6 ... Gas supply portion, 7 ... Collet base (Collet supporting component), R ... Curved surface area

The invention claimed is:

1. A welding torch comprising:
    a plurality of electrodes that are insulated from the welding torch by an insulating material; and
    collets that are in contact with the electrodes and conduct power to the electrodes, wherein
    the electrodes are shaped such that they have an arc-shaped curved surface area in at least a portion of a cross-sectional shape thereof that is orthogonal to the longitudinal direction thereof,
    each collet is provided with a groove portion in which the electrode is fitted, and whose inner wall surface is in contact with a plurality of locations of the curved surface area of the electrode along a cross-section thereof that is orthogonal to the longitudinal direction of the electrode, and
    there are provided projecting portions that protrude from inner wall surfaces of the groove portion, and engagement holes that are provided in the electrode and with which the projecting portions engage.

2. The welding torch according to claim 1, wherein a notch portion is provided in a distal end of the collet that faces towards a distal end side of the electrode.

3. The welding torch according to claim 2, wherein a notch portion is provided in a portion of the distal end of the collet that does not come into contact with the electrode.

4. The welding torch according to claim 1, wherein
    there is provided a collet supporting component that is disposed such that its position is fixed relative to the electrode, and
    the collet is supported by the collet supporting component such that the collet is able to be tilted relative to the electrode.

5. The welding torch according to claim 1, wherein the collet is supported by the collet supporting component such that the collet can be displaced in a direction that is orthogonal to the longitudinal direction of the electrode.

6. The welding torch according to claim 1, wherein the shape of the groove portion when viewed in the longitudinal direction of the electrode is a trapezoidal shape.

\* \* \* \* \*